United States Patent
Brophy et al.

(10) Patent No.: US 6,592,269 B1
(45) Date of Patent: Jul. 15, 2003

(54) APPARATUS AND METHOD FOR INTEGRATING AN OPTICAL TRANSCEIVER WITH A SURFACE MOUNT PACKAGE

(75) Inventors: Brenor L. Brophy, San Jose, CA (US); James H. Lie, San Jose, CA (US); Andrew J. Wright, Mountain View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 09/944,856

(22) Filed: Aug. 31, 2001

(51) Int. Cl.[7] .................................................. G02B 6/36
(52) U.S. Cl. ........................................................ 385/92
(58) Field of Search ............................. 385/92, 91, 88; 439/260

(56) References Cited

U.S. PATENT DOCUMENTS

| | | | | |
|---|---|---|---|---|
| 5,280,191 A | * | 1/1994 | Chang | 257/433 |
| 5,289,345 A | * | 2/1994 | Corradetti et al. | 174/52.3 |
| 5,596,665 A | * | 1/1997 | Kurashima et al. | 385/88 |
| 5,615,089 A | * | 3/1997 | Yoneda et al. | 257/723 |
| 5,708,743 A | * | 1/1998 | DeAndrea et al. | 385/88 |
| 6,213,651 B1 | * | 4/2001 | Jiang et al. | 385/88 |
| 6,325,552 B1 | * | 12/2001 | Brillhart | 385/88 |
| 6,354,844 B1 | * | 3/2002 | Coico et al. | 439/260 |
| 6,508,595 B1 | * | 1/2003 | Chan et al. | 385/92 |

* cited by examiner

Primary Examiner—Tulsidas Patel
Assistant Examiner—Brian S. Webb
(74) Attorney, Agent, or Firm—Lawrence R. Georke; Wagner Murabito & Hao LLP

(57) ABSTRACT

An apparatus and method integrates optical transceivers for transfer of signals between optical and electronic media with surface mount packages, such as ball grid arrays and quad flat packs. A surface mount package is positioned directly beneath a modular optical transceiver. The surface mount package provides for electrically coupling external signals to the optical transceiver, so as to allow full performance functionality of data transfer components. An electrical coupling mechanism with high performance at high frequency is positioned between the surface mount package and the optical transceiver, electrically connecting them. In one implementation, the optical transceiver module is mounted directly to said surface mount package such that it is removable. In one embodiment, heat dissipation is provided by integral components and thermal vias, in addition to heat sinks. The apparatus, in one embodiment, allows optical transceivers to be modular and changeable, without connectors which can degrade high frequency signal transfer.

16 Claims, 8 Drawing Sheets

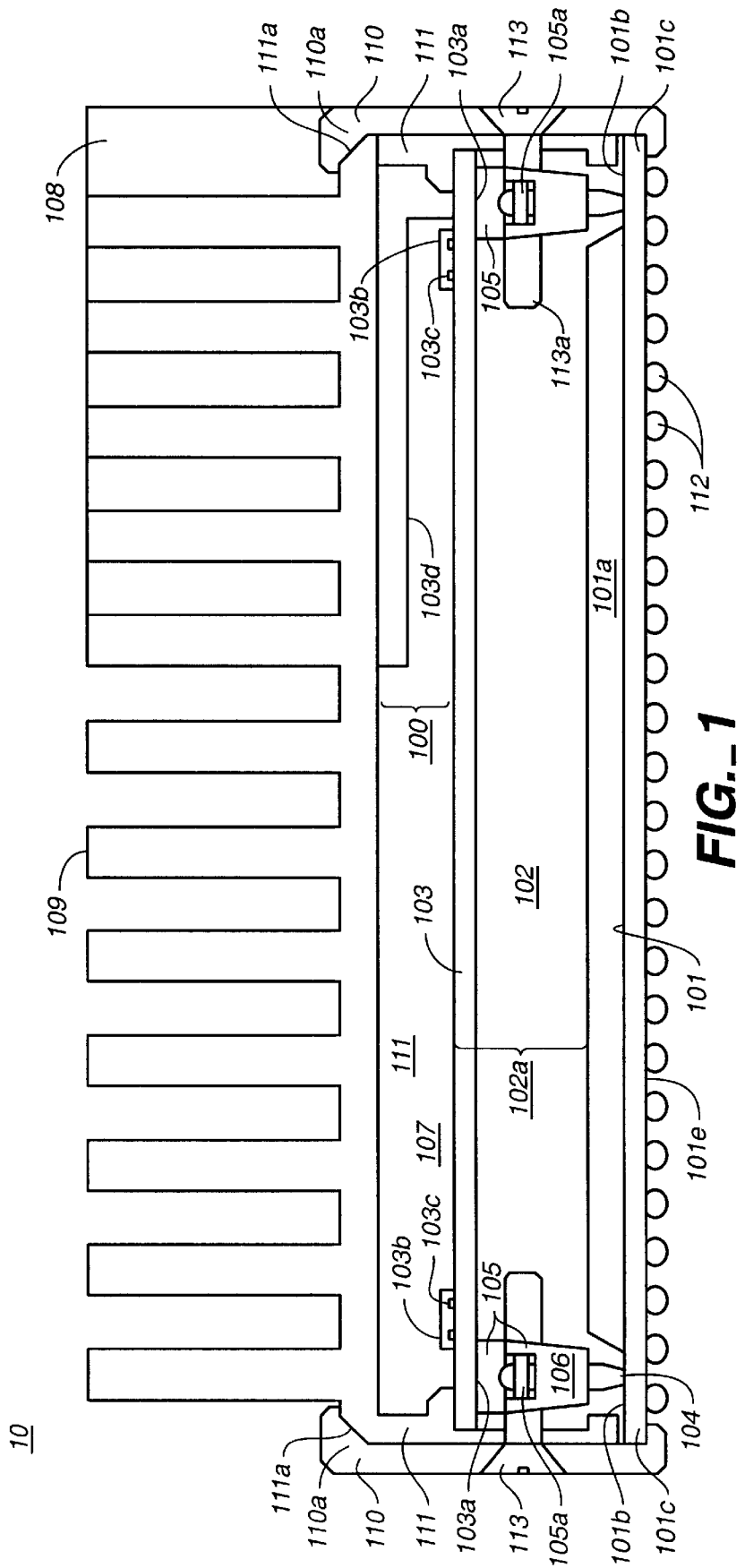
FIG._1

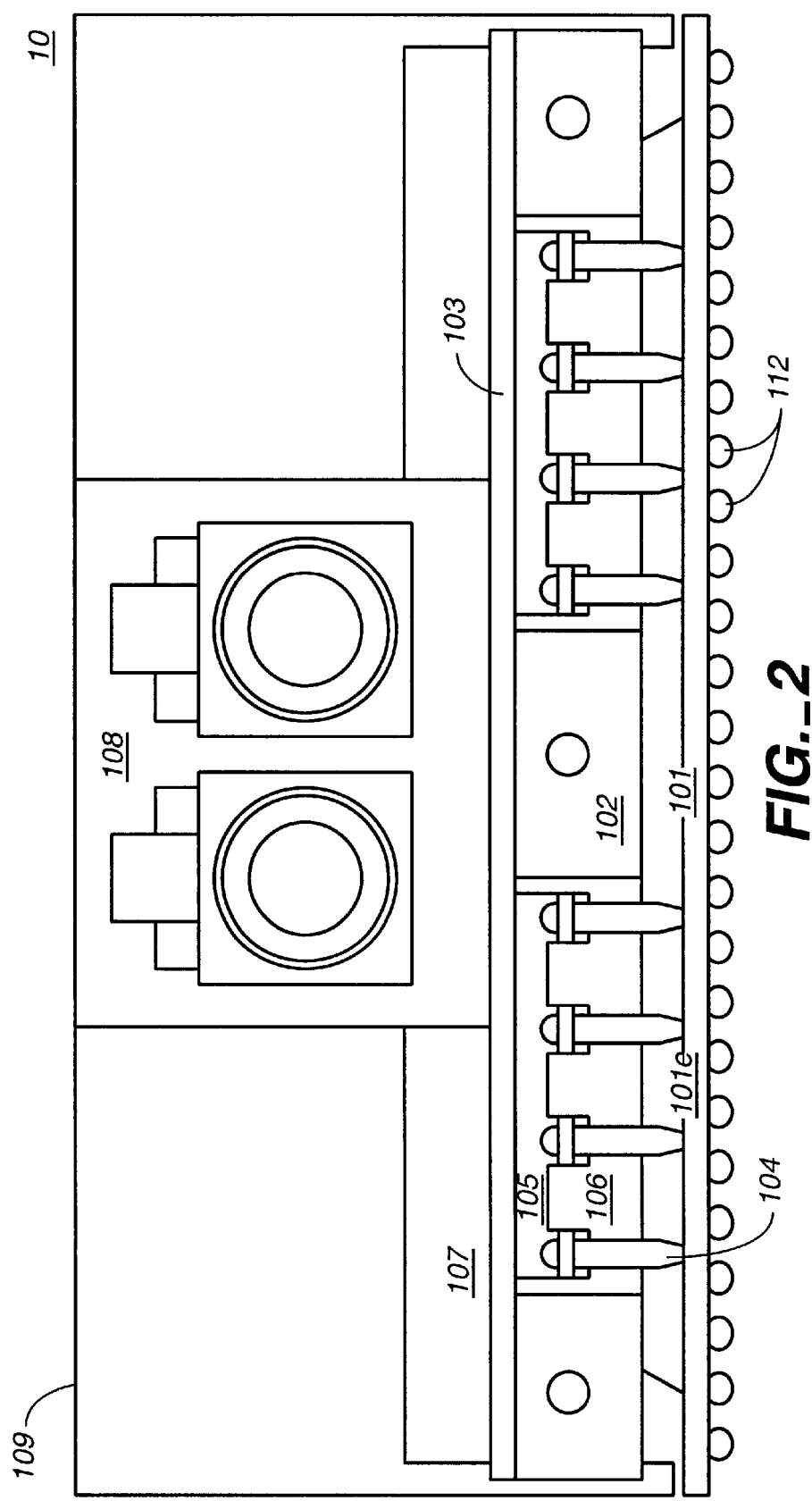
FIG._2

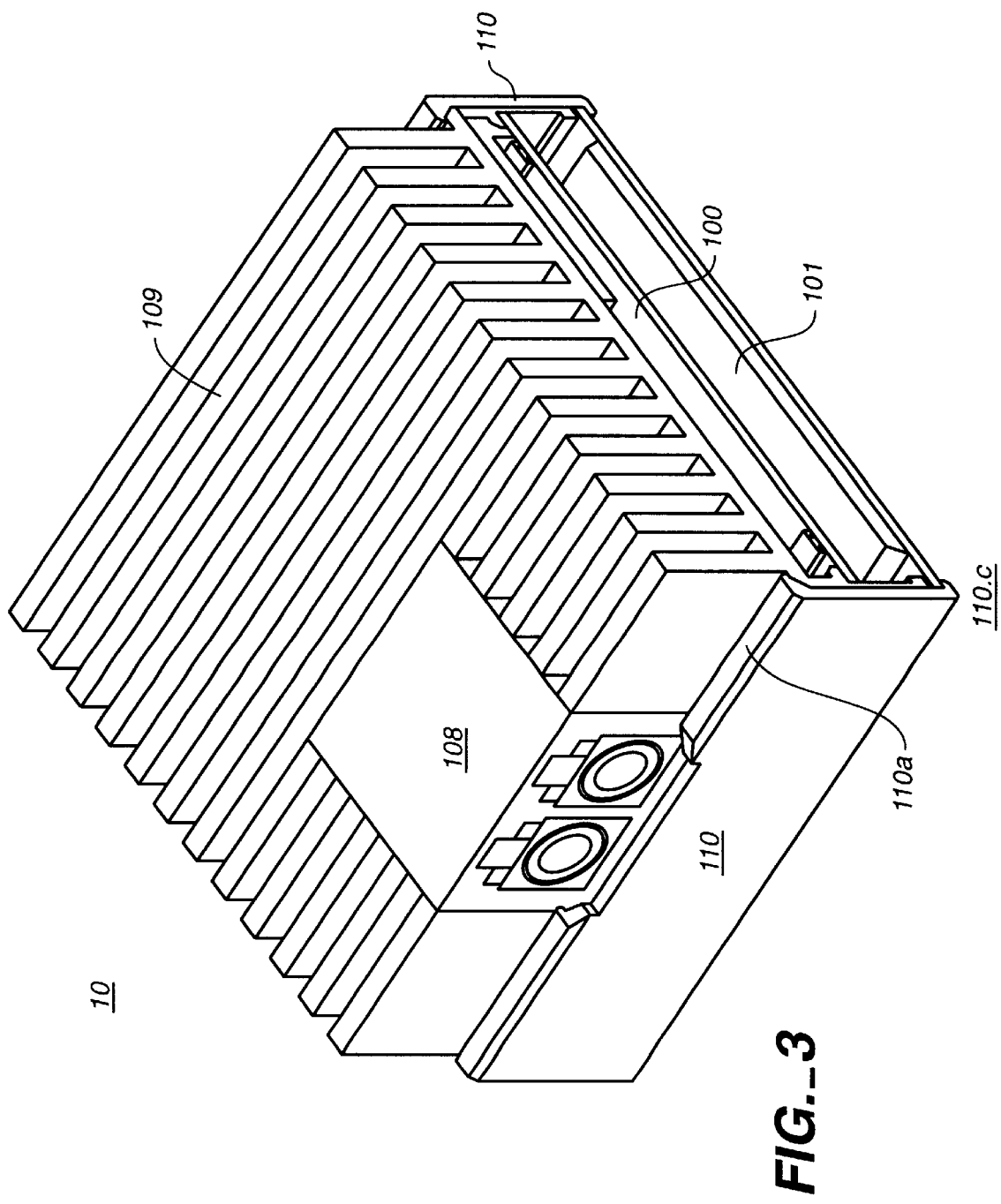
FIG._3

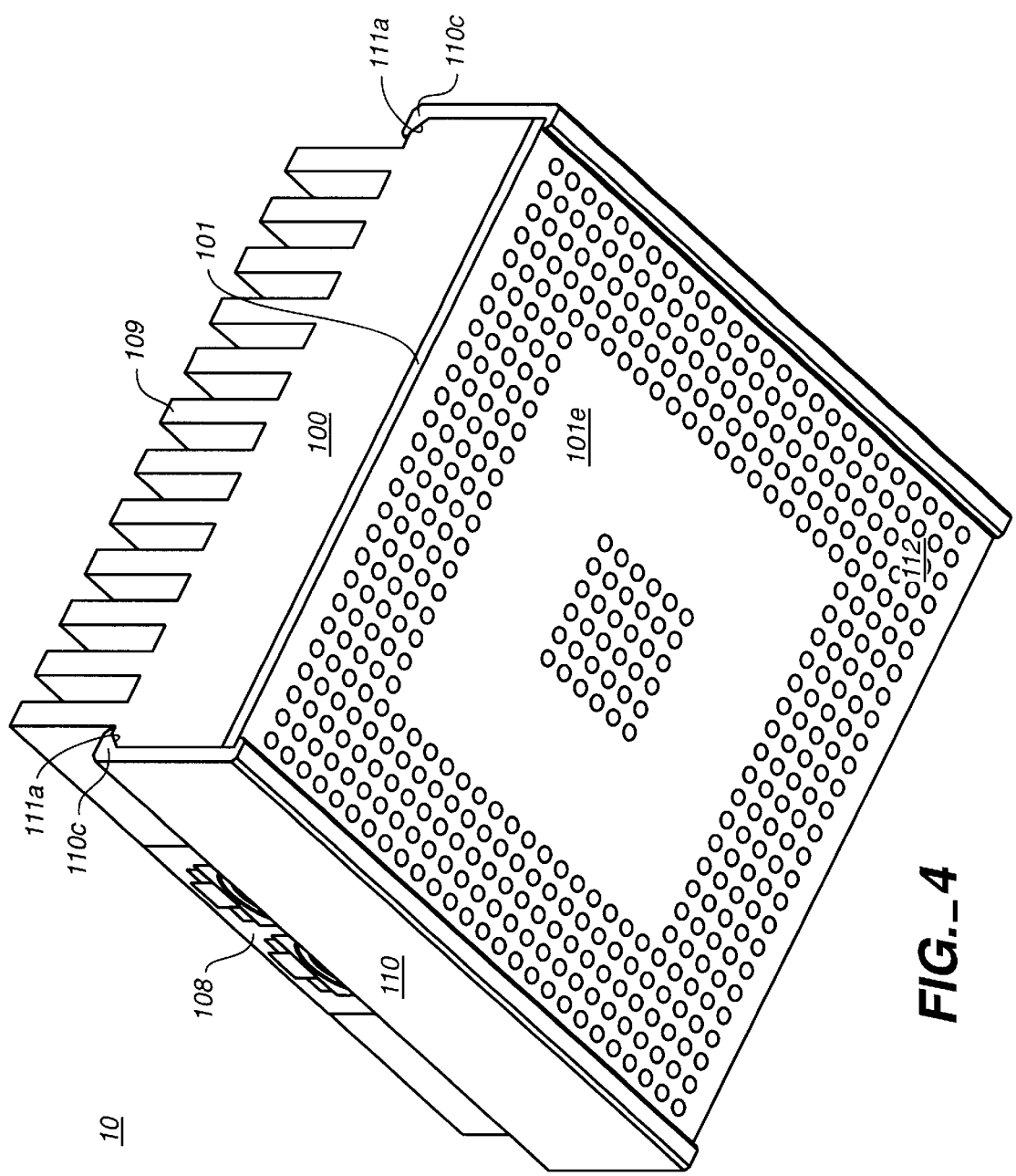
FIG._4

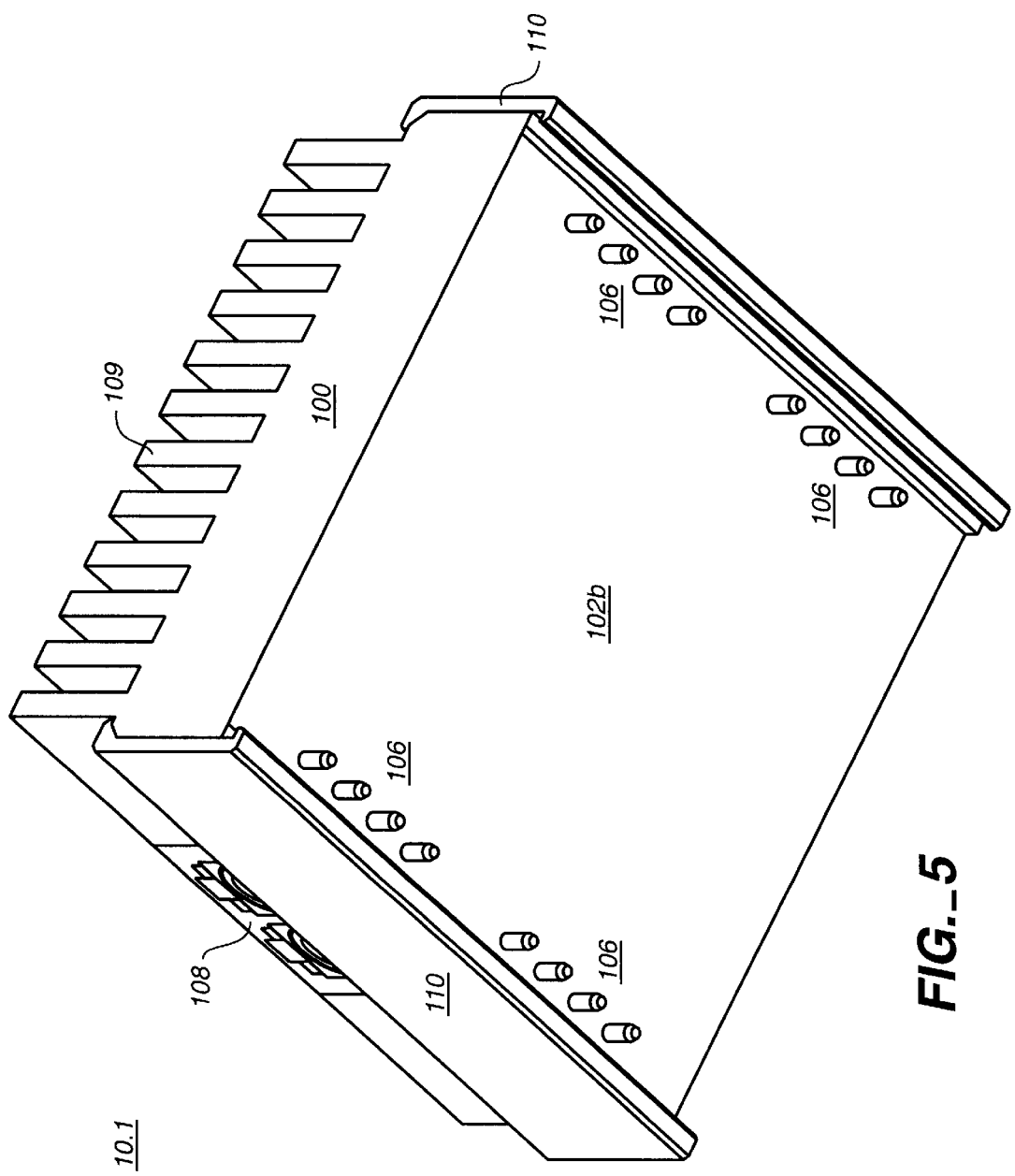
FIG._5

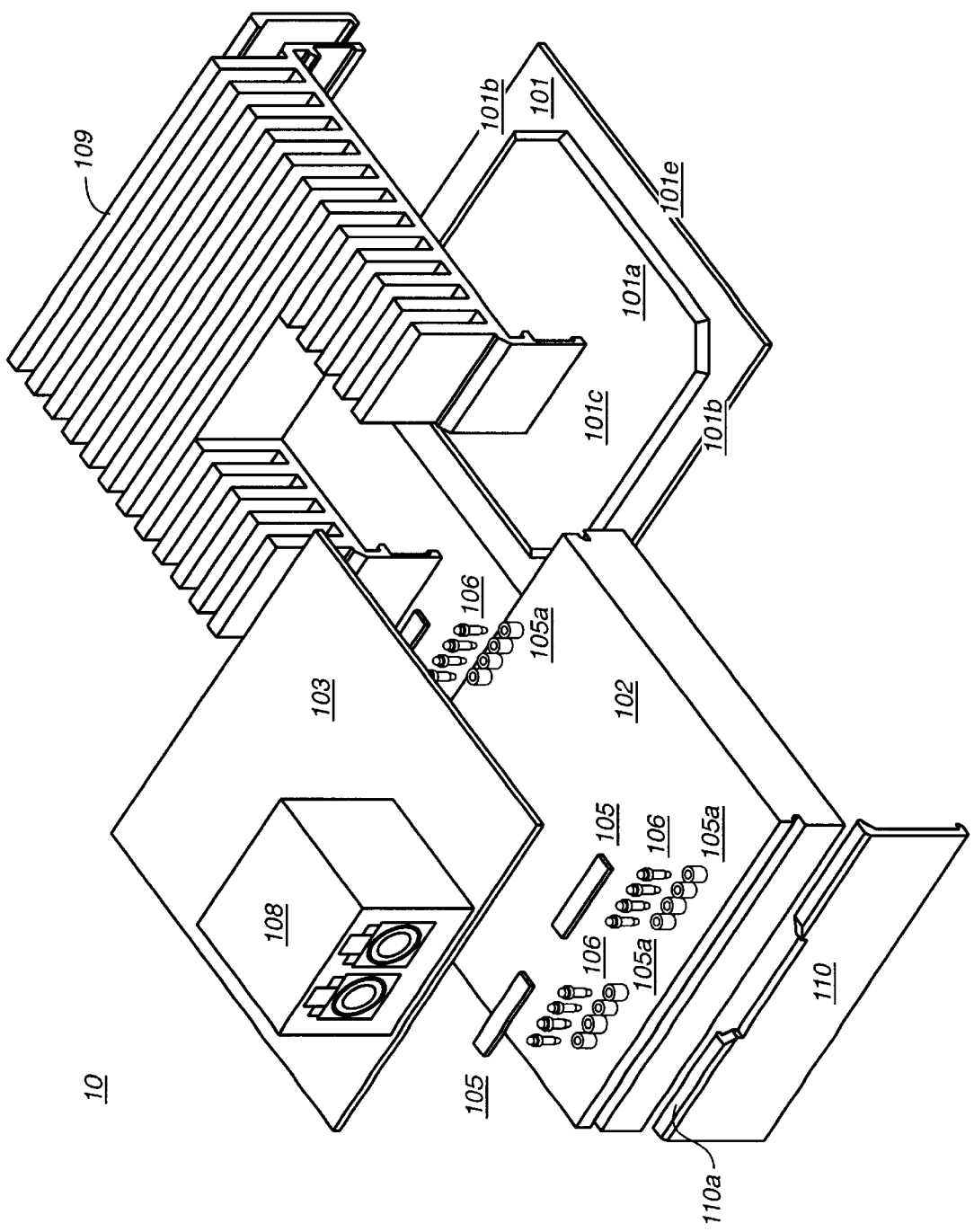

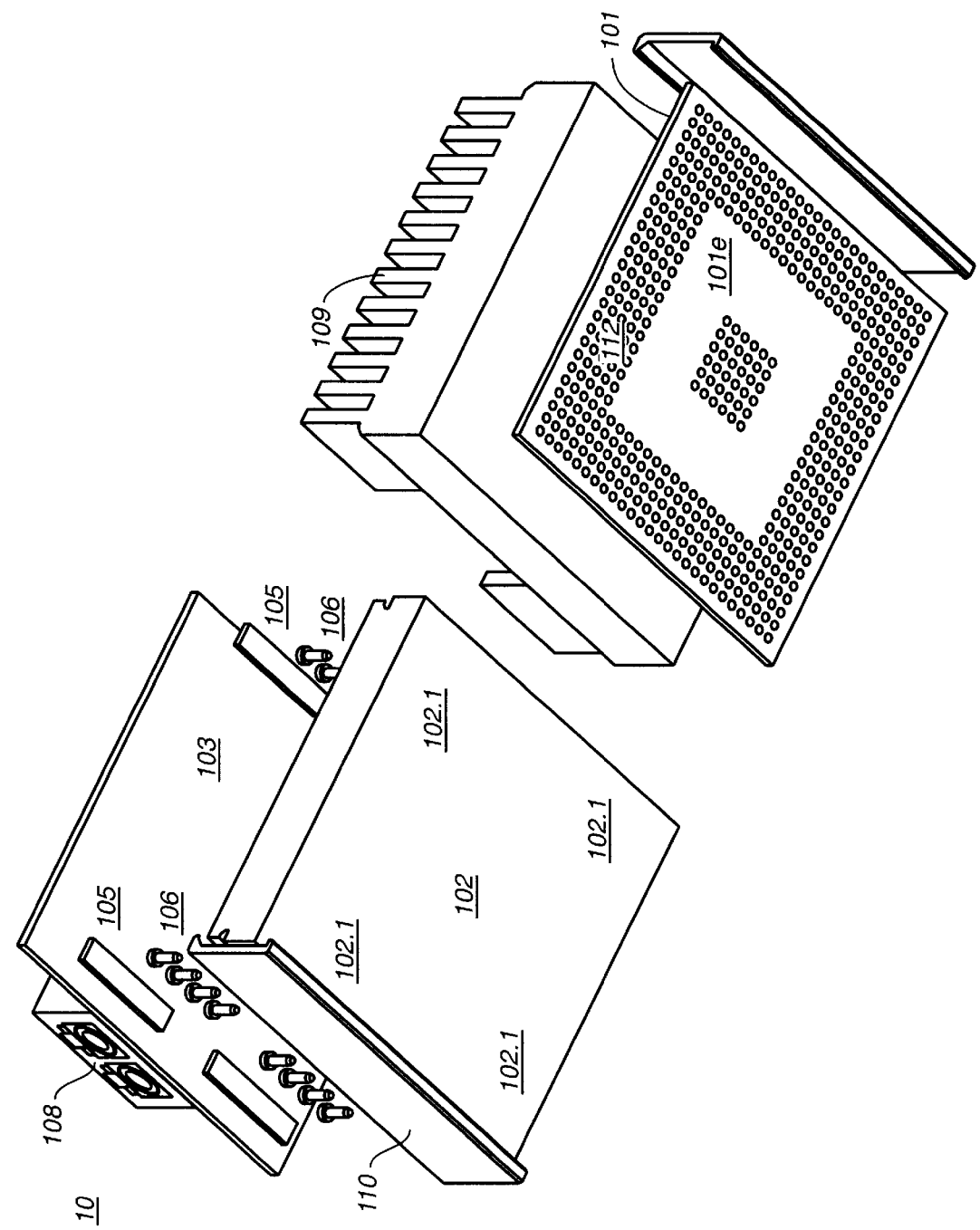
FIG._7

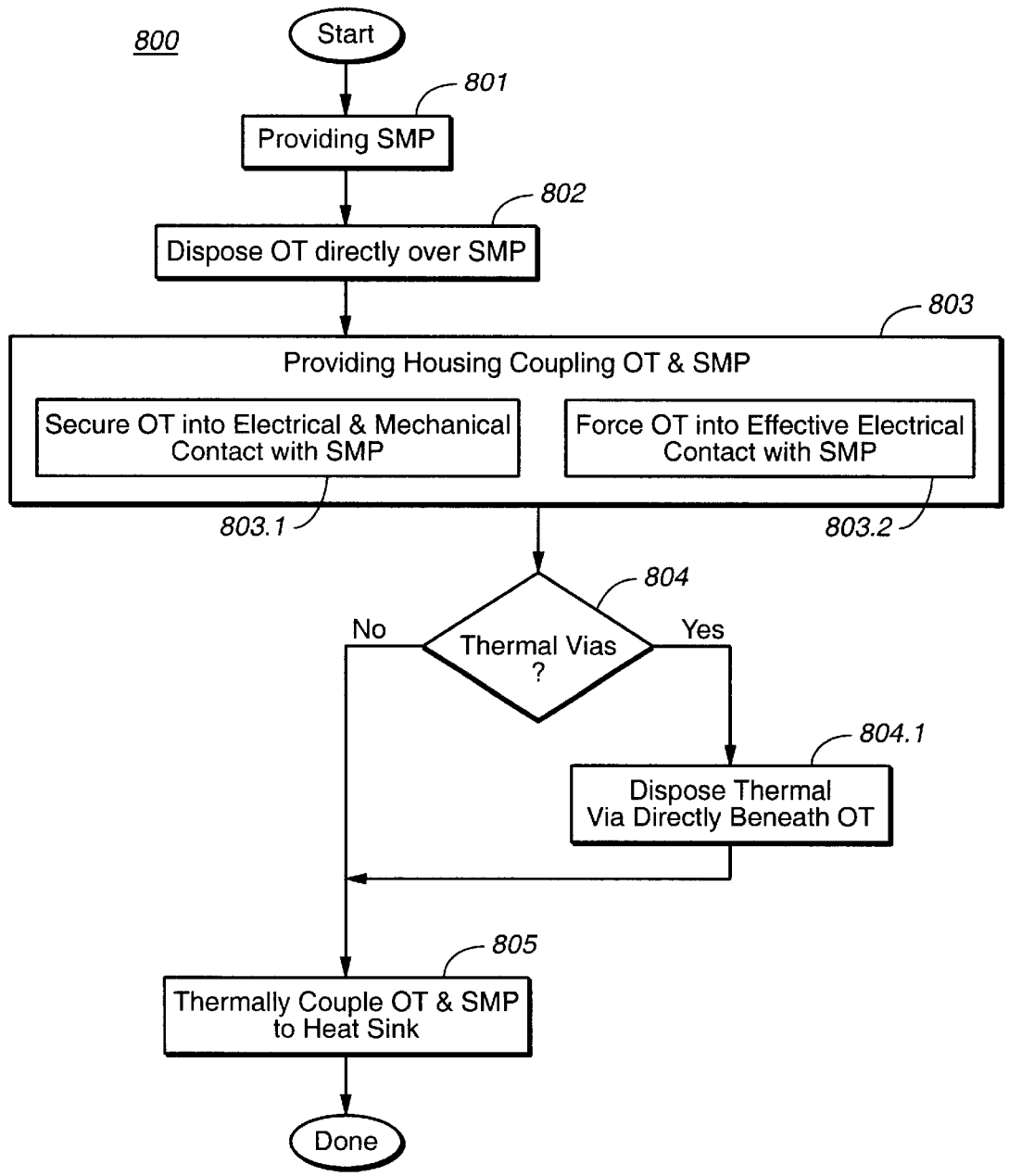
FIG._8

APPARATUS AND METHOD FOR INTEGRATING AN OPTICAL TRANSCEIVER WITH A SURFACE MOUNT PACKAGE

BACKGROUND OF THE INVENTION

1. Field of the Invention

The present invention relates to the field of electro-optical packaging. Specifically, an embodiment of the invention is directed to an apparatus and method for integrating an optical transceiver with a surface mount package.

2. Related Art

As system operating speeds rise, high speed data transmission becomes an important aspect of full system performance. Optical data transmission media are advantageous. Optical transceivers facilitate high speed transmission of data over optical fiber media. Electrical design facilitating high performance at high frequencies are crucial.

Optical transceivers incorporate a light source, often a laser diode (LD) for data transmission, its driver, a photodetector, its amplifier, electrical connections, and an optical system coupling the laser and photodetector to the transmission medium, all integrated in a single package. Optical transceivers with lasers differing in output wavelength, mode, and power may be selected according to a variety of applications. Optical transceivers are integral parts of many electronic data systems, where they receive control and data for transmission from and send feedback and data received to logic devices such as a serializer/deserializer (SERDES). Optical transceivers, typically with relatively few connecting pins, are either mounted directly upon a printed circuit board (PCB), or connected via a socket, which is itself mounted directly upon the PCB.

Optical transceivers, due to the short service lives of their lasers relative to other system components or due to a change in application, such as from short to long haul transmission, may require replacement before other system components. This is potentially wasteful and costly. The socket connection option is a conventional way to address this problem.

In the conventional arrangement, pins of the optical transceiver are connected, individually, to a SERDES device or another logic chip, typically with a larger number of connections than the optical transceiver. This scheme is problematic because the optical transceiver produces a large footprint upon the PCB mounting it. Physically, the optical transceiver requires an inordinate portion of the limited space available on the PCB, reducing the functionality of the PCB by displacing other functional components, and complicating required routing interconnections between functional components.

Further, both the conventional arrangement scheme and socket connection scheme have detracting electrical characteristics, such as high impedance and other poor performance characteristics at high frequencies, tending to limit data transfer speeds. It is also difficult in these schemes, due to the relative paucity of connection pins on the optical transceivers, to integrate the full functionality of the SERDES. Further, the conventional scheme is fraught with a number of fabrication related difficulties.

The first difficulty is that optical transceivers present a relatively large PCB footprint. Thus, their consumption of available PCB space complicates connection layout and reduces PCB space and connectivity available for mounting and connecting other components. Further, their high relative density and corresponding X-ray opacity, coupled with the large footprint prevents application of a non-destructive testing (NDT) modality common in PCB fabrication engineering, quality control, and failure analysis. Second, increases in functionality increase this footprint, correspondingly exacerbating the first difficulty. A third difficulty in mounting and connecting optical transceivers directly to PCBs is the requirement of special manufacturing and inspection techniques.

One such manufacturing technique is to avoid solder reflow. Conventionally, this is accomplished in one way by soldering a special socket for the optical transceivers to the PCB and connecting the optical transceiver thereon. However, this requires additional steps, handling, and components. It also correspondingly increases fabrication and unit costs. Further, sockets complicate and degrade the electrical connectivity between the optical transceivers and the SERDES and other components, with corresponding reduction in data transfer speeds.

Another special fabrication technique of the conventional art is to employ solder reflow, and simply withstanding the correspond high temperatures. However, the internal constitution of optical transceivers incorporates microminiature optics with critical alignments. These are delicate and correspondingly very temperature sensitive. Laser diodes within the optical transceivers are also temperature sensitive. Common optical transceivers may thus be rendered inoperable by exposure in conventional fabrication to the high temperatures associated with reflow. Especially robust optical transceiver packages, made to withstand high reflow temperatures, would be more expensive, thus increasing unit costs.

For inspection, either non-X-ray NDT techniques are required, in the conventional art, or disassembly and/or destructive testing must be used. Non-X-ray NDT may be considerably more expensive than X-ray NDT, given the common application of X-ray NDT in PCB fabrication. The alternatives, disassembly or destructive testing obviate the inherent advantages of NDT, and are also correspondingly expensive and wasteful.

What is needed is a method and/or apparatus that effectively integrates optical transceivers with PCBs and/or other electronic platforms, removably and without a large PCB footprint. What is also needed is a method and/or apparatus that integrates optical transceivers with PCBs and/or other electronic platforms, which has good electrical connectivity attributes and enables full functionality of connected logic and facilitates data transfer speeds at high frequencies. What is further needed is a method and/or apparatus that integrates optical transceivers with PCBs and/or other electronic platforms, which has good thermal and other mechanical characteristics, facilitating effective dissipation of heat accompanying high frequency circuit operation and laser operation, and withstands stresses and strain associated with inserting, changing, and removal of fiber optic connections thereto. What is needed further still is a method and/or apparatus that effectively integrates optical transceivers with PCBs and/or other electronic platforms, which achieves the foregoing advantages while facilitating employment of fabrication and inspection techniques which do not require increased complexity of handling, robustness of components, or cost.

SUMMARY OF THE INVENTION

Embodiments of the present invention provide an apparatus and method that effectively integrates optical transceivers with PCBs and other electronic platforms, removably and with a relatively small PCB footprint. Embodiments of the present invention also provide an apparatus and method that integrates optical transceivers with PCBs and other electronic platforms, which has good electrical connectivity attributes, facilitating data transfer speeds at high frequencies and enabling full interfunctionality with connected logic. Further, embodiments provide an apparatus and method that integrates optical transceivers with PCBs and/or other electronic platforms, which has good thermal and other mechanical characteristics, facilitating effective dissipation of heat accompanying high frequency circuit operation and laser operation, and withstands stresses and strain associated with inserting, changing, and removal of fiber optic connections thereto. Further still, embodiments provide an apparatus and method that effectively integrates optical transceivers with PCBs and other electronic platforms, which achieves the foregoing advantages while facilitating employment of fabrication and inspection techniques which do not require increased complexity of handling, robustness of components, or cost.

The present invention provides an apparatus and method that effectively integrates optical transceivers with PCBs and other electronic platforms, removably and with a relatively small PCB footprint. In one embodiment, a physical arrangement that integrates an optical transceiver with a PCB uses a relatively small portion of the space on the PCB (e.g., in comparison with the conventional art). Advantageously, this increases the functionality of the PCB circuit, by making ample room for mounting other functional components, and simplifying the routing of interconnections between functional components. Further, it facilitates X-ray NDT inspection of the PCBs.

The present invention provides, in one embodiment, an apparatus and method that effectively integrates optical transceivers with PCBs and other electronic platforms, which has good electrical connectivity attributes and enables full functionality of connected logic. Importantly, one feature of the present embodiment is that connectivity between the optical transceiver and the PCB is affected using relatively low impedance connectors that have corresponding characteristically high performance with high frequency electrical signals. Advantageously, this facilitates data transfer at high frequencies. A further advantage of this embodiment is that the connections enable efficient electrical interconnection and interfunctionality between the optical transceiver and logic components crucial to effective data transfer, such as SERDES devices.

The present invention further provides an apparatus and method that integrate optical transceivers with PCBs and/or other electronic platforms, which has good thermal and other mechanical characteristics. In one embodiment, the heat accompanying both high frequency circuit operation and laser operation is effectively dissipated. In one embodiment, the physical mounting of the optical transceiver to the PCB is buttressed by its own construction to effectively withstand the mechanical stresses and strains associated with inserting, changing, and removal of fiber optic connections to the optical transceiver required for optically coupling the laser and photodetector components of the transceiver to the optical fiber data transfer channel, and other mechanical forces.

In one embodiment, the present invention provides an apparatus and method that effectively integrate optical transceivers with PCBs and other electronic platforms, which achieves the foregoing advantages while facilitating employment of fabrication techniques which do not require increased complexity of handling, robustness of components, or cost. The present embodiment obviates sockets, a conventionally required component. Advantageously, dispensing with this heretofore required component further improves electrical performance. Also, the present embodiment is free of the constraints of fabrication related difficulties of the conventional art. Advantageously, this promotes efficiency and correspondingly reduces fabrication costs.

These and other objects and advantages of the present invention will become obvious to those of ordinary skill in the art after reading the following detailed description of the preferred embodiments, which are illustrated in the various drawing figures.

BRIEF DESCRIPTION OF THE DRAWINGS

FIG. 1 is a cross section in side view depicting a surface mount package incorporating an integral optical transceiver, in accordance with one embodiment of the present invention.

FIG. 2 is a cross section in front view depicting a surface mount package incorporating an integral optical transceiver, in accordance with one embodiment of the present invention.

FIG. 3 is a top front right side corner perspective depicting a surface mount package incorporating an integral optical transceiver, in accordance with one embodiment of the present invention.

FIG. 4 is a bottom back side corner perspective depicting a surface mount package incorporating an integral optical transceiver, in accordance with one embodiment of the present invention.

FIG. 5 is a bottom back side corner cross section depicting a surface mount package incorporating an integral optical transceiver, in accordance with one embodiment of the present invention.

FIG. 6 is a top front side exploded view a surface mount package incorporating an integral optical transceiver, in accordance with one embodiment of the present invention.

FIG. 7 is a bottom exploded view a surface mount package incorporating an integral optical transceiver, in accordance with one embodiment of the present invention.

FIG. 8 is a flowchart of the steps in a process for forming a surface mount package with an integrated optical transceiver, in accordance with one embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

In one embodiment of the present invention, a surface mount package for an electronic device such as an integrated circuit or optical transceiver is described as an exemplary ball grid array (BGA). This description is exemplary, and is not meant to limit the implementation of the present invention to the exemplary array. On the contrary, the example is chosen to illustrate one embodiment of the present invention as an example of the full spectrum of surface mount packages for electronic devices. Other such surface mount packages which may implement other embodiments of the present invention include, but are not limited to other BGA designs than the exemplary design depicted and described, other circuit packages, including chip packages such as a flip chip, MicroBGA, BGA chip scale package (BGACSP), Quad FlatPack (QFP), Thin QFP (TQFP), Ceramic QFP (CQFP), small profile QFP (SQFP), and plastic QFP (PQFP).

EXEMPLARY APPARATUS

Exemplary Structure

With reference to FIGS. 1 and 2, an apparatus 10 is constituted as follows. An optical transceiver module 100 is deployed directly over a ball grid array (BGA) packaged device 101. Directly on top of BGA 101 is affixed the core of optical transceiver module 100. Core 102 functions, in one embodiment, to hold electrical connectors 106 in a correct alignment with respect to the top of the. BGA 101 substrate 101a, and to support an optics substrate 103. BGA 101 substrate 101a is attached to the top of a foundational base 101e, the underside of which displays an array of small metallic connecting appurtenances 112.

Electrical connectors 106 are, in various embodiments of the present invention, connectors that have excellent electrical characteristics, including but not limited to low impedance and good impedance matching capability with high speed electronics, at high frequencies above 1 gHz, approaching 10 gHz. In one embodiment, as in the present example, electrical connectors 106 are pogo-pins.

In one embodiment, electrical connectors 106 are fuzz balls, fabricated from gold, or from some other conductor with low resistance and good connectivity and other superior fabrication enabling physical and chemical properties. In one embodiment, electrical connectors 106 are metal dendrite type connectors. In one embodiment, electrical connectors 106 are elastomeric wire grid connectors or another wire in elastomer type high frequency contact. In one embodiment, contact sockets may be used for electrical connectors 106. These may include spring contact sockets, and tweezer, "Y", and side contact, or other, contact arrangements.

In one embodiment, core 102 functions further to act as a heat-sink, and to facilitate the electrical connections from the top of the pogo-pins 106 through an electrically conductive elastomeric wire grid 105, to optics substrate 103.

BGA substrate 101 is designed so that critical signals needed to communicate with the optical transceiver module 100 are brought into the BGA 101 through an array of small metallic connecting appurtenances 112, such as solder balls, through-connected by an internal conduction scheme, and brought out to pads 101b on the edges of the substrate 101. These pads are left uncovered by solder mask material and so receive the standard gold-nickel plating applied to the substrate bond fingers 101c. The plating is important because it provides a hard contact surface for pogo-pins 106, or other electrical conductors.

In one embodiment, the pogo-pins 106 rest inside an optional electrically insulating collar 105a. This is needed if the material constituting core 102 is conducting. In one embodiment, core 102 is constituted of a non-conducting material, and no electrical insulating collar 105a is needed.

Pogo-pins 106 may be either solid or spring-loaded, their most important characteristic is that they perform well for high frequency electrical signals. In one embodiment of the present invention, the pogo pins 106 are made short, to achieve this performance. The top of the pogo-pins 106 contacts the bottom of an elastomer 105. Elastomer 105 is an elastomeric rubber material with a grid of microfine wires, which may be of gold, imbedded therein. The topside of the elastomer 105 is pushed against the bottom side of the optics substrate 103. Exposed pads 105 connect the signals from the pogo pins 106 to components 103b mounted on the optics. Pads 105, in one embodiment, are elastomeric suspended wire grid, to which the pogo pins, in one embodiment solid, compression-connect at the pads' surface 103a.

An interface socket 108 for connecting an optical fiber transmission medium (external) is mounted on the topside of optics substrate 103. The remaining area 111 may be used to attach components such as components 103b, which may include laser drivers, trans-impedance and post amplifiers required by the lasers and photodetectors embedded within optical substrate 103. The whole core assembly 102a, including core 102, pogo-pins 106, pogo insulators 105a, elastomer 105 and optics substrate 103, is slid into an outer case 179.

A recess 111a on the sides and back of the outer case allow a clamp 110 to secure the core assembly together. Clamp 110 has a beveled surface 110a which, when fasteners 113, which in one embodiment may be screws, are torqued or otherwise tightened into a corresponding securing cavity 113a within core 102, simultaneously force-holds the core assembly 102a together and force-makes and wipes pogo-pins 106 into effective electrical contact with corresponding contact surfaces 101c and pad 105. Recess 110a protrudes out further on the topside to provide support against the pressure from the pogo-pins and elastomer by placing corresponding opposing pressure against beveled surface 111a.

Opto-electronic components 103b, such as lasers and photodetectors, and corresponding drivers and amplifiers, etc. may be attached to the optics substrate 103 by a number of methods and media well known in the art. For example, in one embodiment, bare dies are wire bonded. In one embodiment, bare dies are attached by flip-chip. In one embodiment, standard packaged components are soldered on. Passive components are soldered on, in one embodiment.

The top cavity 111 is filled with a material which simultaneously ensures a good thermal path between the components, seals the optics and opto-electronic components from the outside environment, and mechanically fixes the fiber-optic socket 108 securely in place. In one embodiment, the material filling top cavity 111 is a thermal compound. In one embodiment, the material filling top cavity 111 is an epoxy compound.

The fiber-optic socket 108 is engineered to fit exactly between the optics substrate and the underside of the module lid/heat-sink 109. Advantageously, this provides a very solid mechanical assembly to withstand stresses and strains from inserting and removing external fiber-optic cable connectors (external; not shown).

Exemplary Mounting and Thermal Dispensation

Still with reference to FIGS. 1 and 2, a fabricated printed circuit board (PCB), in one embodiment of the present invention, with a surface mount package, such as the exemplary BGA structure 101 receives an optical module 100 mounted on its top. A thermal compound filling cavity 111, applied to top of the BGA package 101 resists the optical transceiver module 100, pressure-mounted against the topside of the BGA 101.

Optical transceiver module 100 presses against the thermal compound filling cavity 111. A shaped recess 102b in the bottom of the core 102 and shaped to mate with the top of the BGA package 101a aligns the positioning of the optical transceiver module 100 upon BGA 101. The two side clamps 110 press against the sides 179 such that they hook under the BGA substrate 101c and over the back & front edges of the module 100. Screws 113, in one embodiment, are used to lock the clamps to the module. Screws 113 are threaded into recesses 113a, which can be complementarily threaded. In one embodiment, other fasteners are used.

The top edge of the clamps 110 is beveled to an angular bevel 110a, as is the top edge 111a of the optical transceiver module 100. As the screws 113 are tightened the beveled edges force the module into tight contact with the BGA, thus effecting a good electrical contact between the BGA substrate pads 101c, the pogo-pins 106, and the conductive elastomeric wire grid pads 105.

In the present invention, running at high speed to enable high frequency data transmission is desirable. As with other designs, devices herein consume more power, correspondingly producing more heat, when run at high speed. Further, components of optical transceivers, especially laser diodes, have heating considerations beyond non-opto-electronic components. For example, some lasers will not work at temperatures greater than 70C, and most devices tend to slow down at elevated temperatures. Thus, one embodiment of the present invention efficiently conducts away heat to the environment and cools components therein.

In one embodiment, adequate thermal performance is assured by several features. A large heat-sink 109 forms the lid of the module. Heat sink 109 is thermally connected to the four sides and the core 102 of the module. Heat passes from the BGA 101, through the core 102, to the heat-sink 109, where it is radiated to ambient.

In one embodiment, an external fan may be mounted to the top of heat sink 109 to augment heat transfer from the surface of heat sink 109 by increasing the mass flow rate of an atmospheric gas, in one embodiment air, over the surface of the heat sink 109. In the present embodiment, the top of the fiber-optic socket 108 is flush with the top of the heat-sink 109; thus the optical transceiver module with heat sink assembly is well suited for the addition of a small fan.

The optics substrate 103 has, in one embodiment, thermal vias 103c under critical components (e.g., a laser diode) 103b, to convey heat from the component 103b on the topside of the substrate 103 to the core 102 on the bottom side.

In one embodiment, the cavity 111 that houses the optics components 103b may be filled with a thermally conductive compound 107. In the present embodiment, this creates an adequate thermal path from the topside of the components directly to the heat-sink. Thermal performance is enhanced in one embodiment by combining any of the foregoing cooling modalities. In another embodiment, thermal performance is enhanced by combining all of the foregoing cooling modalities.

Some of components 103b, such as the lasers and photodetectors, may be housed, in one embodiment, within the fiber-optics connector. In the present embodiment, a copper plane 103d on the substrate may be used as a heat conductor to bring heat from under the fiber-optic connector 108 to the surface of the optics substrate where it can contact the thermal compound that fills the top cavity.

Representative Perspectives of the Exemplary Apparatus

With reference to FIG. 3, the exemplary apparatus 10 is displayed as assembled, from the perspective of the top front right side corner (relative to the cross-section of FIG. 2). The vertical plates constituting top heat sink 109 are mounted on top of the apparatus 10, enveloping all but the top, bottom, and front of fiber optic socket 108.

Fiber optic socket 108 and top heat sink 109 are mounted above optical transceiver 100. Surface mount package 101 is below optical transceiver 100. Clamp 110 exerts pressure laterally, and via its bevels 110a vertically, to mechanically secure the apparatus, and to force and wipe into effective electrical contact internal electrical connecting components (e.g., pogo pins 106 and pads 101b and 105; FIG. 1). In one embodiment, clamps 110 may form part of a housing 110.0 enclosing apparatus 10 and securing its components.

Referring now to FIG. 4, the exemplary apparatus 10 is displayed as assembled, from the perspective of the bottom front right side corner (relative to the cross-section of FIG. 2). The vertical plates constituting top heat sink 109 are mounted on top of the apparatus 10, enveloping all but the top, bottom, and front of fiber optic socket 108. Fiber optic socket 108 and top heat sink 109 are mounted above optical transceiver 100.

Clamp 110 exerts pressure laterally, and via its bevels 110a vertically, to mechanically secure the apparatus, and to force and wipe into effective electrical contact internal electrical connecting components (e.g., pogo pins 106 and pads 101b and 105; FIG. 1). Bevels 111a on edges of optical transceiver 100 substrate receive binding pressure from corresponding bevels 110a on clamps 110.

Surface mount package 101 is below optical transceiver 100. Connecting solder balls 112 are arrayed on the bottom surface of BGA 101, for mounting on a PCB and connection to signal sources to be brought into the apparatus 10, and to signal receptors to receive signals from the apparatus 10.

With reference to FIG. 5, a similar perspective (to that of FIG. 4) shows an assembly 10.1, corresponding to apparatus 10 without BGA 101 installed. The vertical plates constituting top heat sink 109 are mounted on top of the apparatus 10, enveloping all but the top, bottom, and front of fiber optic socket 108. Fiber optic socket 108 and top heat sink 109 are mounted above optical transceiver 100. Clamps 110 abut optical transceiver 100.

The bottom 102b of optical transceiver 100 is depicted with pogo pins 106 arrayed, projecting downward from within optical transceiver 100.

Referring to FIG. 6, an exploded view from the front upper right corner of apparatus 10 is depicted. Fiber optics socket 108 is optically connected to and directly above optical transceiver 103. Heat sink 109 is shown removed to the rear. Clamp 110 is shown to the front. Core 102 is shown behind clamp 110.

Core 102 functions, in one embodiment, to hold pogo pins 106 in a correct alignment with respect to the top of the BGA 101 substrate 101a, and to support optics substrate 103.

Beneath optics substrate 103, shown suspended as arrayed within the apparatus 10, are pogo pins 106. Beneath pogo pins 106, suspended as arrayed within the apparatus 10, are elastomeric insulating collars 105a. This is needed if the material constituting core 102 is conducting. In one embodiment, core 102 may be constituted of a non-conducting material, and no electrical insulating collars 105a are needed.

BGA 101 is depicted to the right rear, beneath the heat sink 109. The substrate 101a is mounted on top of foundational base 101e. Base 101e exposes at its edges, pads 101b. These pads are left uncovered by solder mask material and so receive the standard gold-nickel plating applied to the substrate bond fingers 101c (FIG. 1).

Within BGA 101 is an internal integrated circuit (IC) 101c. In one embodiment, electronic components associated with optical transceiver 100 (FIG. 1) may be a part of IC 101C. In one embodiment, data transfer enabling components, such as SERDES devices, may be integral thereto. Other embodiments may incorporate other functions and enabling components into IC 101c.

FIG. 7 depicts an exploded view of apparatus 10 from the lower right front corner (with respect to FIG. 1). Heat sink 109 is shown removed to the right, above BGA 101. BGA 101 displays solder connection balls 112, arrayed upon BGA foundation 101e. Clamp 110 is shown removed to the left.

The core 102 of optical transceiver 100 (FIG. 1) is shown removed below optics substrate 103, over which is fiber optics connection module 108. Between core 102 and optics substrate 103 are shown, removed as arrayed within, pogo pins 106. Shown removed above them are exposed pads 105, which connect signals from the pogo pins 106, specifically from the gold wires embedded therein to components 103b (FIG. 1) mounted on the optics substrate 103. The bottom of core 102 also displays arrayed penetrations 102.1, through which pogo pins 106 contact substrate bond fingers 101c (FIG. 1), on pads 101b (FIG. 1).

EXEMPLARY PROCESSES

FIG. 8 presents the steps in a process 800 for forming an opto-electronic apparatus integrating an optical transceiver (e.g., optical transceiver 100; FIG. 1) with a surface mount package (e.g., surface mount package 101; FIG. 1). Beginning with step 801, a surface mount package (SMP) is provided. The SMP includes a alto provision for vertically electrically coupling to an overlying device.

The SMP provided may, in one embodiment, be a ball grid array (BGA). In other embodiments, other SMPs may be provided, including but not limited to a quad flatpack (QFP), a thin QFP (TQFP), a plastic QFP, or a small profile QFP, also called a shrink QFP (SQFP).

In step 802, an optical transducer (OT) is positioned and secured directly over the SMP, such that the optical transceiver is electrically coupled to the SMP. Electrical coupling may be effectuated by connections (e.g., connections 106; FIG. 1) that have high performance at high frequencies. In one embodiment, such connections may be made by pogo pins connecting to elastomeric wire grid (e.g., connection pad 105; FIG. 1). In other embodiments, other connections may be employed, including but not limited to metallic dendrites, fuzz-balls, spring contact sockets, and contact sockets.

A housing is provided as a core (e.g., core 102; FIG. 1) coupling the optical transceiver and the SMP; step 803. The core housing functions, through penetrations (e.g., penetrations 102.1; FIG. 7) therein to array and align a number of electrical connectors, such as pogo pins (e.g., connectors 106; FIG. 1) to electrically interconnect the optical transducer with the underlying SMP.

The core is a rigid structure, which may be either electrically insulating or conductive. If the core is electrically conductive, separate insulators (e.g., insulating collars 105a; FIG. 1) are provided to electrically insulate the connectors from the conductive core through which they are arrayed. The core may be plastic, ceramic, or metallic.

In one embodiment, the core housing secures the optical transducer into electrical and mechanical contact with the SMP; step 803.1. In one embodiment, the core housing serves to force, such as through the employment of clamps and fasteners (e.g., clamps 110 and fasteners 113, respectively; FIG. 1), the optical transducer into effective electrical contact with the SMP; step 803.2. In one embodiment, the pogo pins are solid and compression connect to exposed elastomer suspended wire grid to effectuate an electrical connection with high performance at high frequencies, advantageously enabling high speed signal and data transfer.

Thermal design promotes cooling of the optical transducer's laser and dissipation of heat generated by high speed signal transfer, further effectuating integration of optical transducers and SMPs. In one embodiment, the core is also thermally conductive. Advantageously, this embodiment allows the core to function as a heat sink, which may also have other components (e.g., top heat sink 109; FIG. 1). In step 804, a determination is made as to whether thermal vias will be included in the thermal design.

If it is determined to include thermal vias, they are disposed directly beneath the optical transducer in step 804.1, such that they may channel heat generated within components of the optical transducer, such as the laser, into the core, and/or to other components constituting a heat sink. Upon disposition of the thermal vias, or if they are not to be employed in the thermal design, the optical transceiver is thermally coupled to the SMP; step 805. This completes process 800.

In summary, the present invention provides an apparatus and method that effectively integrates optical transceivers with PCBs and other electronic platforms, removably and with a relatively small footprint thereon. The present invention also provides an apparatus and method that integrates optical transceivers with PCBs and other electronic platforms, which has good electrical connectivity attributes, facilitating data transfer speeds at high frequencies and enabling full interfunctionality with connected logic. Further, the present invention provides an apparatus and method that integrates optical transceivers with PCBs and/or other electronic platforms, which has good thermal and other mechanical characteristics, facilitating effective dissipation of heat accompanying high frequency circuit operation and laser operation, and withstands stresses and strain associated with inserting, changing, and removal of fiber optic connections thereto. Further still, the present invention provides an apparatus and method that effectively integrates optical transceivers with PCBs and other electronic platforms, which achieves the foregoing advantages while facilitating employment of fabrication and inspection techniques which do not require increased complexity of handling, robustness of components, or cost.

In accordance with one embodiment of the present invention, an apparatus is implemented in which an optical transceiver for transfer of signals between optical and electronic media is integrated with a surface mount package, such as those for housing a semiconductor device. The surface mount package is positioned directly beneath the optical transceiver, which is in a module. The surface mount package provides for electrically coupling to the optical transceiver. An electrical coupling mechanism positioned between the surface mount package and the optical transceiver couples the optical transceiver to the surface mount package by a connector receptacle for receiving the optical transceiver so as to electrically couple the electrical coupling mechanism to the optical transceiver. In one embodiment, the surface mount package used in the may be a ball grid array (BGA), a quad flatpack (QFP), a thin QFP (TQFP), a plastic QFP, or a small profile QFP, also called a shrink QFP (SQFP). In one implementation of the apparatus, the optical transceiver module is mounted directly to said surface mount package. In one embodiment, a method for integrating an optical transceiver and surface mount package thereby is effectuated.

In one embodiment, an opto-electronic apparatus is implemented with an optical transceiver and a BGA directly beneath it. The BGA bottom surface exposes a grid of conductive elements, such as solder balls; its top surface exposes a pattern of conductive pads. A core substrate is located between its surfaces, which is thermally conductive and thermally couples the BGA, its conductive pads, and the optical transceiver. A mechanism between the BGA and the optical transceiver electrically couples them. In one embodiment, a housing mechanically couples the optical transducer, core substrate, electrical coupling mechanism and the BGA. In one embodiment, the apparatus is implemented with a heat sink and a thermal via coupled to the heat sink, and the housing is also thermally conductive and is also thermally coupled to the via, directly beneath optical transceiver components, which transfers heat into the core substrate. The apparatus may also have a casing and a number of clamps that couple to it, engaging the optical transceiver and BGA, and coupling them together. These may include beveled edges adapted to engage corresponding bevels of the casing, forcing the optical transceiver into an effective electrical contact with the BGA, upon tightening fasteners which engage and secure the housing. The optical transceiver is removably coupled to the apparatus, advantageously facilitating field changing of the optical transceiver and conserving resources thereby.

An embodiment of the present invention, an apparatus and method for integrating an optical transceiver and a surface mount, is thus described. While the present invention has been described in particular embodiments, it should be appreciated that the present invention should not be construed as limited by such embodiments, but rather construed according to the below claims.

What is claimed is:

1. An apparatus comprising:
   an optical transceiver for transferring signals between optical and electronic media;
   a surface mount package for housing a semiconductor device, said surface mount package disposed beneath said optical transceiver, and for electrically coupling to said optical transceiver; and
   an electrical coupling mechanism disposed between said surface mount package and said optical transceiver, and for coupling said optical transceiver to said surface mount package, wherein said electrical coupling mechanism comprises a connector receptacle for receiving said optical transceiver to electrically couple said electrical coupling mechanism to said optical transceiver, and wherein said optical transceiver is removably coupled to said surface mount package, and wherein said electrical coupling mechanism comprises an array of conductive elements selected from the group consisting of pogo pins, metallic dendrites, fuzz-balls, elastomeric wire grids, spring contact sockets, and contact sockets.

2. The apparatus as recited in claim 1, wherein said surface mount package is selected from the group consisting of ball grid arrays, quad flatpacks, thin quad flatpacks, plastic quad flatpacks, and small profile quad flatpacks.

3. The apparatus as recited in claim 2, wherein said optical transceiver module is mounted directly to said surface mount package.

4. The apparatus as recited in claim 3, wherein said optical transceiver module is electrically coupled through said surface mount package to an external circuit.

5. An opto-electronic package apparatus comprising:
   an optical transceiver;
   a ball grid array disposed beneath said optical transceiver, and comprising a bottom surface, said bottom surface exposing a grid of conductive elements, said ball grid array further comprising a top surface, said top surface exposing a pattern of conductive pads;
   a thermally conductive core substrate disposed between said bottom and top surfaces for thermally coupling said ball grid array and said pattern and said optical transceiver; and
   an electrical coupling mechanism disposed between said ball grid array and said optical transceiver and for electrically coupling said optical transceiver to said ball grid array, wherein said coupling mechanism removably coupling said optical transceiver to said apparatus, and wherein said electrical coupling mechanism is selected from the group consisting of pogo pins, metallic dendrites, fuzz-balls, elastomeric wire grids, spring contact sockets, and contact sockets.

6. The apparatus as recited in claim 5, further comprising a housing for mechanically coupling said optical transceiver, said core substrate, and said electrical coupling mechanism to said ball grid array.

7. The apparatus as recited in claim 5, further comprising:
   a heat sink; and
   a thermal via coupled to said heat sink, and wherein said housing is thermally conductive, said housing thermally coupled to said via.

8. The apparatus as recited in claim 7, wherein said thermal via is disposed beneath said optical transceiver.

9. The apparatus as recited in claim 8, wherein said thermal via transfers heat into said core substrate.

10. The apparatus as recited in claim 6, wherein said housing further comprises:
    a casing; and
    a plurality of clamps that couple to said casing, said plurality of clamps engaging said optical transceiver and engaging said ball grid apparatus for coupling said optical transceiver to said ball grid apparatus.

11. The apparatus as recited in claim 10, wherein said clamps comprise beveled edges to engage corresponding bevels disposed upon said casing, wherein said bevels force said optical transceiver into an effective electrical contact with said ball grid array upon tightening fasteners fasteningly engaging said housing.

12. A method for forming an opto-electronic apparatus comprising:
    providing a surface mount package, said surface mount package comprising a provision for vertically electrically coupling to an overlying device;

disposing an optical transceiver directly over said surface mount package, such that said optical transceiver is electrically coupled to said surface mount package;

thermally coupling said surface mount package and said optical transceiver to a heat sink, wherein said heat sink includes a top heatsink; and disposing a thermal via directly beneath said optical transceiver.

13. The method as recited in claim 12, further comprising:

providing a housing that couples said optical transceiver to said surface mount package.

14. The method as recited in claim 13, wherein said housing is thermally conductive.

15. The method as recited in claim 13, wherein said providing a housing that couples said optical transceiver to said surface mount package further comprises:

securing said optical transceiver into electrical and mechanical contact with said surface mount package; and forcing said optical transceiver into an effective electrical contact with said surface mount package.

16. The method as recited in claim 12, wherein said optical transceiver is removably coupled to said surface mount package.

* * * * *